United States Patent
Bates et al.

(10) Patent No.: US 9,009,671 B2
(45) Date of Patent: *Apr. 14, 2015

(54) CRASH NOTIFICATION BETWEEN DEBUGGERS

(71) Applicant: International Business Machines Corporation, Armonk, NY (US)

(72) Inventors: Cary L. Bates, Rochester, MN (US); Justin K. King, Rochester, MN (US); Lee Nee, Rochester, MN (US); Michelle A. Schlicht, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/766,012

(22) Filed: Feb. 13, 2013

(65) Prior Publication Data

US 2014/0165042 A1 Jun. 12, 2014

Related U.S. Application Data

(63) Continuation of application No. 13/711,005, filed on Dec. 11, 2012.

(51) Int. Cl.
*G06F 9/44* (2006.01)
*G06F 9/45* (2006.01)
*G06F 11/00* (2006.01)
*G06F 11/36* (2006.01)

(52) U.S. Cl.
CPC .......... *G06F 11/362* (2013.01); *G06F 11/3632* (2013.01)

(58) Field of Classification Search
None
See application file for complete search history.

(56) References Cited

U.S. PATENT DOCUMENTS

| | | | |
|---|---|---|---|
| 6,745,344 B1 | 6/2004 | Joshi et al. | |
| 7,574,697 B2 | 8/2009 | Biberstein et al. | |
| 8,412,984 B2 * | 4/2013 | Maybee et al. | 714/38.1 |
| 2004/0230961 A1 * | 11/2004 | Biberstein et al. | 717/150 |
| 2005/0278569 A1 * | 12/2005 | Srinivasan et al. | 714/25 |
| 2006/0010337 A1 | 1/2006 | Suzuki | |
| 2006/0277528 A1 * | 12/2006 | Chen et al. | 717/124 |
| 2006/0288332 A1 * | 12/2006 | Sagar et al. | 717/124 |
| 2009/0037775 A1 | 2/2009 | Chi et al. | |
| 2009/0217235 A1 | 8/2009 | Suenbuel | |
| 2010/0057865 A1 | 3/2010 | Chan et al. | |
| 2010/0192132 A1 | 7/2010 | Yuan et al. | |
| 2012/0110353 A1 | 5/2012 | Ehrlich et al. | |
| 2012/0124426 A1 | 5/2012 | Maybee et al. | |
| 2012/0151452 A1 * | 6/2012 | Zinkovsky et al. | 717/129 |
| 2012/0278657 A1 | 11/2012 | Baker et al. | |
| 2012/0311146 A1 * | 12/2012 | Strub et al. | 709/224 |
| 2014/0095935 A1 | 4/2014 | Zimmerman et al. | |

OTHER PUBLICATIONS

Office Action, U.S. Appl. No. 13/711,005, May 23, 2014, pp. 1-23.

* cited by examiner

*Primary Examiner* — Don Wong
*Assistant Examiner* — Daxin Wu
(74) *Attorney, Agent, or Firm* — Biggers Kennedy Lenart Spraggins, LLP

(57) ABSTRACT

Crash notification between debuggers, including: initiating, by a first debugger, a first debug session of a first application; detecting, by the first debugger, an error condition in the first application; determining, by the first debugger, whether any variables utilized by the first application are related to variables utilized by a second application, wherein the second application is being debugged in a second debug session by a second debugger; and communicating, by the first debugger to a second debugger, information associated with the error condition in the first application.

5 Claims, 4 Drawing Sheets

CRASH NOTIFICATION BETWEEN DEBUGGERS

CROSS-REFERENCE TO RELATED APPLICATION

This application is a continuation application of and claims priority from U.S. patent application Ser. No. 13/711,005, filed on Dec. 11, 2012.

BACKGROUND OF THE INVENTION

1. Field of the Invention

The field of the invention is data processing, or, more specifically, methods, apparatus, and products for crash notification between debuggers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In today's computing environments, separate application programs often interact with one another. A client application program and a server application program that communicate with one another is one example. One class of problems that occur in a distributed environment is created by incorrect data being propagated to other programs comprising the distributed application. In many cases this bad data can actually cause several programs running on different systems to crash. Debugging such applications may be difficult as the debuggers do not understand the interdependencies of each program.

SUMMARY OF THE INVENTION

Methods, apparatus, and products for crash notification between debuggers, including: initiating, by a first debugger, a first debug session of a first application; detecting, by the first debugger, an error condition in the first application; determining, by the first debugger, whether any variables utilized by the first application are related to variables utilized by a second application, wherein the second application is being debugged in a second debug session by a second debugger; and communicating, by the first debugger to a second debugger, information associated with the error condition in the first application.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
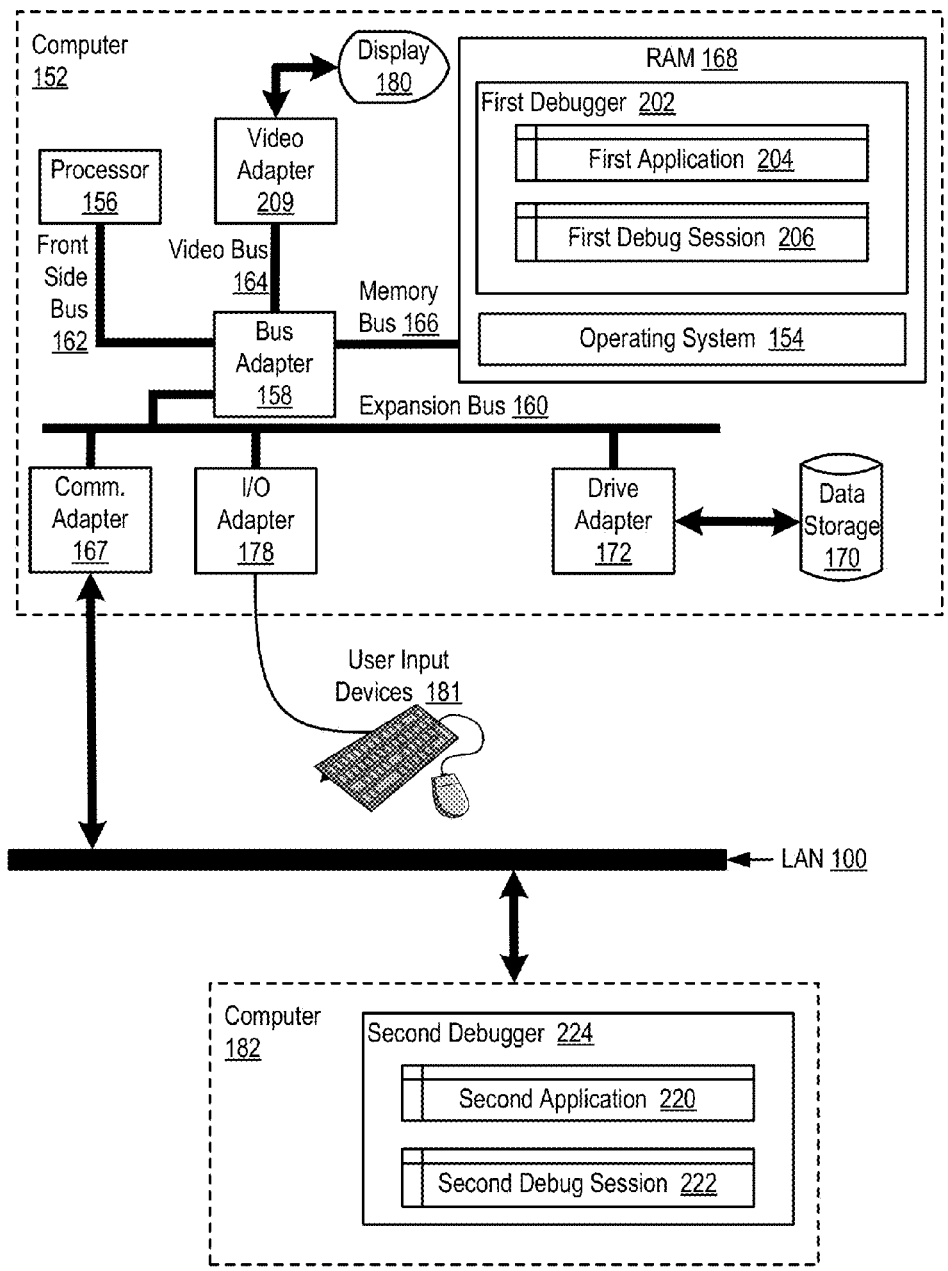
FIG. 1 sets forth a block diagram of automated computing machinery comprising an example computer useful in crash notification between debuggers according to embodiments of the present invention.

Example methods, apparatus, and products for crash notification between debuggers in accordance with the present invention are described with reference to the accompanying drawings, beginning with FIG. 1. FIG. 1 sets forth a block diagram of automated computing machinery comprising an example computer (152) useful in crash notification between debuggers according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a first debugger (202), a module of computer program instructions utilized to test and debug other computer programs, such as a first application (204). The first debugger (202) may be configured such that a user can step through a target computer program to identify execution flow of the program, to determine the value of variables utilized by the program, and to identify crashes and other errors generated during the execution of the program, and so on.

In the example of FIG. 1, the first debugger (202) can carry out crash notification between debuggers by initiating a first debug session (206) of the first application (204). The first application (204) may be embodied as a computer program that includes a set of computer program instructions. In such an example, initiating a first debug session (206) of the first application (204) can enable a user to execute the first application (204) one instruction at a time, to execute all instructions of the first application (204) that reside between a set of breakpoints, and otherwise examine the execution of the first application (204).

In the example of FIG. 1, the first debugger (202) can further carry out crash notification between debuggers by detecting an error condition in the first application (204). The error condition in the first application (204) represents the occurrence of an event during which the first application (204) ceases to function properly. Examples of an error condition can include the first application (204) crashing, the first application (204) attempting to perform an operation on a null value, the first application (204) attempting to access protected or otherwise unavailable memory, and so on.

In the example of FIG. 1, the first debugger (202) can further carry out crash notification between debuggers by determining whether any variables utilized by the first application (204) are related to variables utilized by a second application (220). In the example of FIG. 1, the second application (220) is embodied as a computer program executing on another computer (182). Variables utilized by the first application (204) may be related to variables utilized by the second application (220) for a variety of reasons. For example, the value of a variable utilized by the first application (204) may be generated by a function call to the second application (220) such that the variables utilized by the second application (220) are inputs to some operation that generates a return value from the function call to the second application (220). Likewise, the value of a variable utilized by the first application (204) may be generated by accessing a location in memory that is manipulated by the second application (220) such that the variables utilized by the second application (220) impact the value that the second application (220) writes to the shared location in memory. In such an example, determining whether any variables utilized by the first application (204) are related to variables utilized by the second application (220) may be carried out by determining whether the value assigned to a variable utilized by the first application (204) are directly or indirectly dependent on a function call to the second application (220), by determining whether the value assigned to a variable utilized by the first application (204) is dependent upon memory that is accessible to the second application (220), and so on.

In the example of FIG. 1, the first debugger (202) can further carry out crash notification between debuggers by communicating, to a second debugger (224), information associated with the error condition in the first application (204). In the example of FIG. 1, the second debugger (224) is executing on another computer (182) and includes a second debug session (222) for debugging the second application (220). The information associated with the error condition in the first application (204) may include, for example, information identifying the line number at which the error condition occurred, information identifying the value associated with each variable being utilized by the first application (204) at the time the error condition occurred, an error code identifying the nature of the error condition, and so on. Communicating the information associated with the error condition in the first application (204) may be carried out, for example, by the first debugger (202) sending a message to the second debugger (224) over a data communications network, by the first debugger (202) writing the information associated with the error condition to an area of memory that is monitored by the second debugger (224), and so on.

Also stored in RAM (168) is an operating system (154). Operating systems useful crash notification between debuggers according to embodiments of the present invention include UNIX™, Linux™, Microsoft XP™, AIX™, IBM's i5/OS™, and others as will occur to those of skill in the art. The operating system (154), first debugger (202), first application (204), and first debug session (206) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for crash notification between debuggers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for crash notification between debuggers according to embodiments of the present invention include modems for wired dial-up communications, Ethernet (IEEE 802.3) adapters for wired data communications network communications, and 802.11 adapters for wireless data communications network communications.

Figure 2:
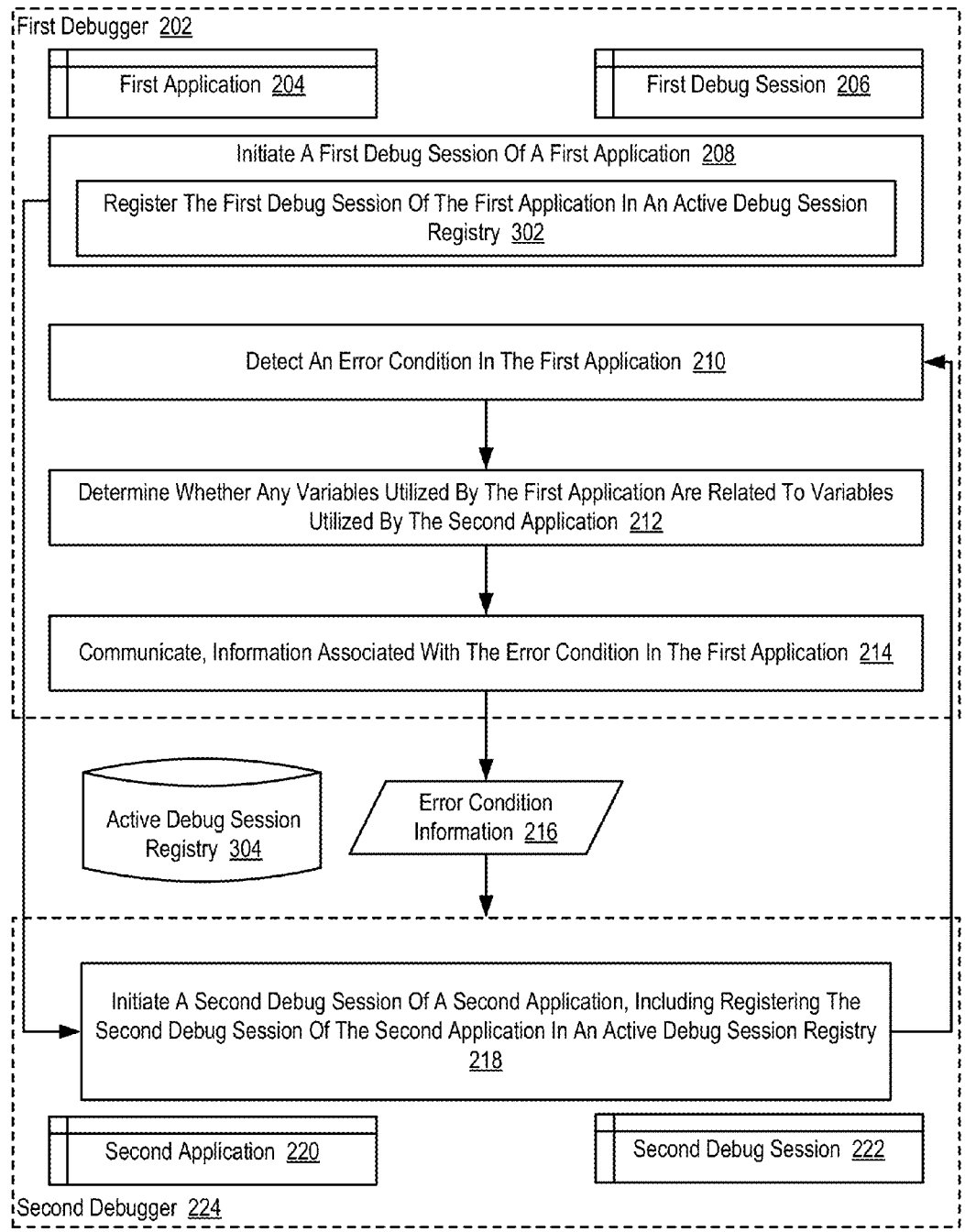
FIG. 2 sets forth a flow chart illustrating an example method for crash notification between debuggers according to embodiments of the present invention.

For further explanation, FIG. 2 sets forth a flow chart illustrating an example method for crash notification between debuggers according to embodiments of the present invention. The example method of FIG. 2 includes a first debugger (202) and a second debugger (224). In the example method of FIG. 2, the first debugger (202) and the second debugger (224) may be embodied, for example, as computer programs that are utilized to test and debug other computer programs, such as a first application (204) and a second application (220). In the example method of FIG. 2, each debugger (202, 224) may be configured such that a user can step through a target computer program to identify execution flow of the program, to determine the value of variables utilized by the program, and to identify crashes and other errors generated during the execution of the program, and so on.

The method of FIG. 2 includes initiating (208), by the first debugger (202), a first debug session (206) of a first application (204). In the example method of FIG. 2, the first application (204) may be embodied as a computer program that includes a set of computer program instructions. In such an example, initiating (208) a first debug session (206) of the first application (204) can enable a user to execute the first application (204) one instruction at a time, to execute all instructions of the first application (204) that reside between a set of breakpoints, and otherwise examine the execution of the first application (204).

In the example method of FIG. 2, initiating (208) the first debug session (206) of the first application (204) includes registering (302) the first debug session (206) of the first application (204) in an active debug session registry (304). The active debug session registry (304) of FIG. 2 represents an area of computer memory that includes information identifying one or more debug sessions that are active. Entries in the active debug session registry (304) can include information identifying the application being debugged, information identifying the variables used by the application being debugged, information identifying areas of memory that can be accessed by application being debugged, information identifying data sources such as a database that can be accessed by application being debugged, and so on. In the example method of FIG. 2, registering (302) the first debug session (206) of the first application (204) in an active debug session registry (304) may be carried out, for example, by creating an entry in the active debug session registry (304) that represents the first debug session (206) of the first application (204).

The method of FIG. 2 also includes initiating (218), by the second debugger (224), a second debug session (222) of a second application (220). In the example method of FIG. 2, the second application (220) may be embodied as a computer program that includes a set of computer program instructions. In such an example, initiating (218) a second debug session (222) of the second application (220) can enable a user to execute the second application (220) one instruction at a time, to execute all instructions of the second application (220) that reside between a set of breakpoints, and otherwise examine the execution of the second application (220).

In the example method of FIG. 2, initiating (218) the second debug session (222) of the second application (220) includes registering the second debug session (222) of the second application (220) in an active debug session registry (304). Registering the second debug session (222) of the second application (220) may be carried out, for example, by creating an entry in the active debug session registry (304) that represents the second debug session (222) of the second application (220). In such a way, each debug session that is occurring across a network connected environment may become aware of all other debug sessions that are occurring on computers in the network connected environment by searching the entries in the active debug session registry (304).

The method of FIG. 2 also includes detecting (210), by the first debugger (202), an error condition in the first application (204). In the example method of FIG. 2, the error condition in the first application (204) represents the occurrence of an event during which the first application (204) ceases to function properly. Examples of an error condition can include the first application (204) crashing, the first application (204) attempting to perform an operation on a null value, the first application (204) attempting to access protected or otherwise unavailable memory, and so on.

The method of FIG. 2 also includes determining (212), by the first debugger (202), whether any variables utilized by the first application (204) are related to variables utilized by the second application (220). As described above, the second application (220) is being debugged in a second debug session (222) by a second debugger (224). In the example method of FIG. 2, variables utilized by the first application (204) may be related to variables utilized by the second application (220) for a variety of reasons. For example, the value of a variable utilized by the first application (204) may be generated by a function call to the second application (220) such that the variables utilized by the second application (220) are inputs to some operation that generates a return value from the function call to the second application (220). Likewise, the value of a variable utilized by the first application (204) may be generated by accessing a location in memory that is manipulated by the second application (220) such that the variables utilized by the second application (220) impact the value that the second application (220) writes to the shared location in memory. In such an example, determining (212) whether any variables utilized by the first application (204) are related to variables utilized by the second application (220) may be carried out by determining whether the value assigned to a variable utilized by the first application (204) are directly or indirectly dependent on a function call to the second application (220), by determining whether the value assigned to a variable utilized by the first application (204) is dependent upon memory that is accessible to the second application (220), and so on.

The method of FIG. 2 also includes communicating (214), by the first debugger (202) to the second debugger (224), information (216) associated with the error condition in the first application (204). In the example method of FIG. 2, the information (216) associated with the error condition in the first application (204) may include, for example, information identifying the line number at which the error condition occurred, information identifying the value associated with each variable being utilized by the first application (204) at the time the error condition occurred, an error code identifying the nature of the error condition, and so on. In the example method of FIG. 2, communicating (214) the information (216) associated with the error condition in the first application (204) may be carried out, for example, by the first debugger (202) sending a message to the second debugger (224), by the first debugger (202) writing the information (216) associated with the error condition to an area of memory that is monitored by the second debugger (224), and so on. By communicating information (216) between such debuggers (202, 224), users of each debugger (202, 224) helps the user to better understand the nature of the problem sooner and allows them to take corrective action.

Figure 3:
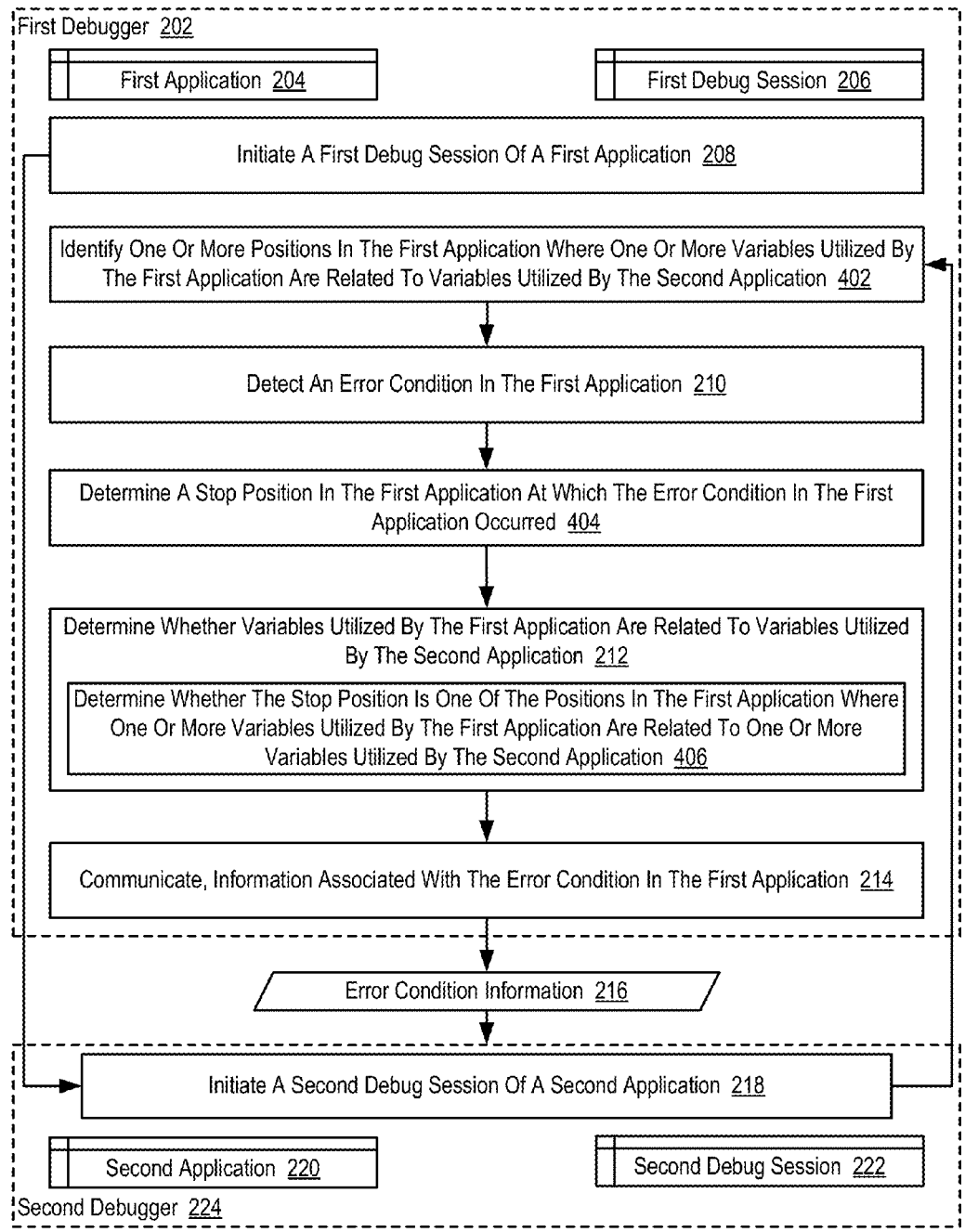
FIG. 3 sets forth a flow chart illustrating an additional example method for crash notification between debuggers according to embodiments of the present invention.

For further explanation, FIG. 3 sets forth a flow chart illustrating an additional example method for crash notification between debuggers according to embodiments of the present invention. The method of FIG. 3 is similar to the method of FIG. 2 as it also includes initiating (208) a first debug session (206) of a first application (204), detecting (210) an error condition in the first application (204), determining (212) whether any variables utilized by the first application (204) are related to variables utilized by the second application (220), and communicating (214) information (216) associated with the error condition in the first application (204) to the second debugger (224).

The example method of FIG. 3 also includes identifying (402), by the first debugger (202), one or more positions in the first application (204) where one or more variables utilized by the first application (204) are related to one or more variables utilized by the second application (220). In the example method of FIG. 3, a position in the first application (204) where one or more variables utilized by the first application (204) are related to one or more variables utilized by the second application (220) represents a segment of code in the first application (204) where the value of one or more variables utilized by the first application (204) may be impacted by variables utilized by the second application (220). Consider the following pseudocode example:

```
int FirstAppVariable = SecondApplication (FirstParam, SecondParam);
if (FirstAppVariable >= 1)
    {
        ThirdApplication (FirstAppVariable);
    } else
    {
        FourthApplication (FirstAppVariable);
    }
FirstAppVariable = 1;
```

In the first line of the code segment, an integer variable named 'FirstAppVariable' is initialized and set to a value that is generated by making a function call to a function named 'SecondApplication' that resides in a second application. In the second line of the code segment, the value returned by the function call to the second application is utilized in evaluating a conditional statement. In the third through fifth lines of the code segment, a function call to a function named 'ThirdApplication' is conditionally made. In the sixth through eighth lines of the code segment, a function call to a function named 'FourthApplication' is conditionally made. In the ninth line of the code segment, the value of 'FirstAppVariable' is set to 1.

In such an example, the first through ninth lines of the code segment represent positions in the first application (204) where one or more variables utilized by the first application (204) are related to one or more variables utilized by the second application (220). That is, in the first through ninth line of the example code segment, the value of 'FirstAppVariable' is set to a value generated by a function call to the second application. At the tenth line of the code segment, however, the value of 'FirstAppVariable' is set to 1 during every iteration of the code segment such that the value of 'FirstAppVariable' is no longer related to one or more variables utilized by the second application (220). In the example method of FIG. 3, identifying (402) one or more positions in the first application (204) where one or more variables utilized by the first application (204) are related to one or more variables utilized by the second application (220) may therefore be carried out, for example, by automatically examining the code for dependencies, by receiving input from a user identifying code segments that include dependencies, and so on.

The example method of FIG. 3 also includes determining (404), by the first debugger (202), a stop position in the first application (204) at which the error condition in the first application (204) occurred. In the example method of FIG. 3, the a stop position in the first application (204) represents the line of code, or a range of lines, within the first application (204) at which the error condition in the first application (204) occurred.

In the example method of FIG. 3, determining (21) whether any variables utilized by the first application (204) are dependent upon variables utilized by the second application (220) includes determining (406) whether the stop position is one of the positions in the first application (204) where one or more variables utilized by the first application (204) are related to one or more variables utilized by the second application (220). In the example method of FIG. 3, determining (406) whether the stop position is one of the positions in the first application (204) where one or more variables utilized by the first application (204) are related to one or more variables utilized by the second application (220) may be carried out, for example, by comparing the line number in a code segment for the stop position to line numbers in the code segment where one or more variables utilized by the first application (204) are related to one or more variables utilized by the second application (220). In such a way, the first debugger (202) can determine if the error condition occurred at a point during the execution of the first application (204) at which variables utilized by the first application (204) are related to one or more variables utilized by the second application (220).

In situations in which the error condition occurred at a point during the execution of the first application (204) at which variables utilized by the first application (204) are related to one or more variables utilized by the second application (220), the second application (220) may be responsible for the error condition encountered in the first application (204). That is, the error condition that was encountered in the first application (204) may be the result of the second application (220) improperly manipulating a variable that is related to a variable utilized by the first application (204).

Consider the example pseudocode included above that includes the following statements:

int FirstAppVariable=SecondApplication (FirstParam, SecondParam);
    if (FirstAppVariable>=1)

If the function call to 'SecondApplication' resulted in the return of a null value, an error condition may be encountered in the second line of the code segment when an attempt is made to determine whether a value of null is greater than or equal to an integer value of 1. In such an example, the debugger that is analyzing this code segment in the first application will raise an error condition. The cause of the error condition, however, is possibly the result of some erroneous code segments in the second application that returned a null value rather than an integer value as expected by the first application.

Figure 4:
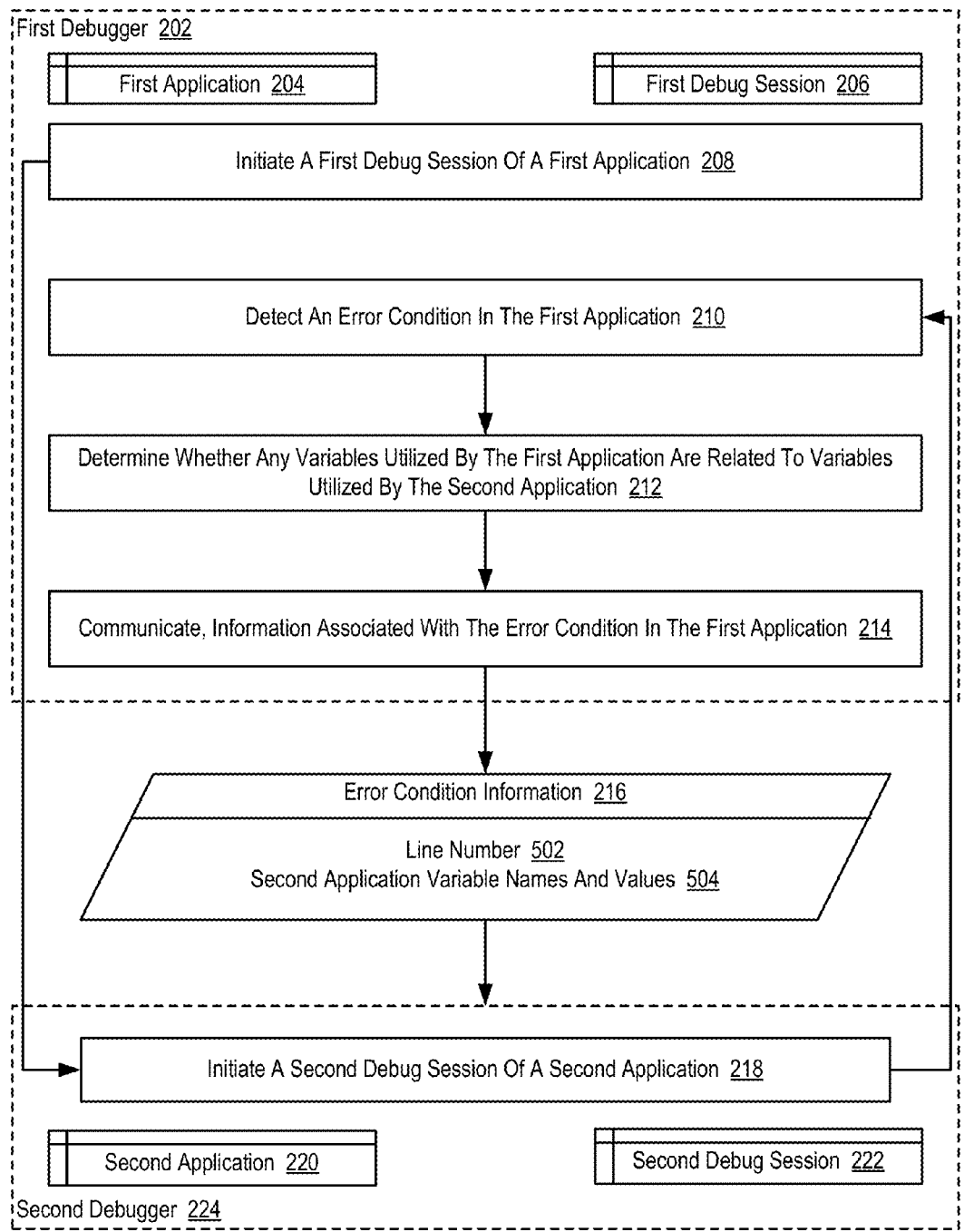
FIG. 4 sets forth a flow chart illustrating an additional example method for crash notification between debuggers according to embodiments of the present invention.

For further explanation, FIG. 4 sets forth a flow chart illustrating an additional example method of crash notification between debuggers according to embodiments of the present invention. The method of FIG. 4 is similar to the method of FIG. 2 as it also includes initiating (208) a first debug session (206) of a first application (204), detecting (210) an error condition in the first application (204), determining (212) whether any variables utilized by the first application (204) are related to variables utilized by the second application (220), and communicating (214) information (216) associated with the error condition in the first application (204) to the second debugger (224).

In the example method of FIG. 4, the information (216) associated with the error condition in the first application (204) can include a line number (502) in the first application at which the error condition occurred. In such an example, the line number (502) in the first application at which the error condition occurred can be used to identify the variables utilized by the second application (220) that are related to variables that were utilized by the first application (204) at the time that the error condition was encountered. For example, the code in the first application (204) that is identified by the line number (502) may be examined to identify a function call to the second application (220), a reference to memory or a data structure that is utilized by the second application (220), and so on. The information (216) associated with the error condition in the first application (204) could also include the names and values (502) of variables in the first application (204) that are related to variables in the second application (220), as well as other information as will occur to those of skill in the art.

In the example method of FIG. 4, the information (216) associated with the error condition in the first application (204) can also include the names and values (504) of variables in the second application (220) that are related to variables in the first application (204). In the example method of FIG. 4, the names and values (504) of variables in the second application (220) that are related to variables in the first application (204) may be embodied as identifiers of the variables, pointers to the variables, memory locations for the variables, and so on.

Example embodiments of the present invention are described largely in the context of a fully functional computer system for crash notification between debuggers. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA programming language, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of crash notification between debuggers, the method comprising:
   initiating, by a first debugger, a first debug session of a first application;
   detecting, by the first debugger, an error condition in the first application;
   identifying, by the first debugger, one or more positions in the first application where one or more variables utilized by the first application are related to one or more variables utilized by the second application;
   determining, by the first debugger, a stop position in the first application at which the error condition in the first application occurred; and
   determining, by the first debugger, whether any variables utilized by the first application are related to variables utilized by a second application, wherein the second application is being debugged in a second debug session by a second debugger; wherein determining whether any variables utilized by the first application are dependent upon variables utilized by the second application further comprises determining whether the stop position is one of the positions in the first application where one or more variables utilized by the first application are related to one or more variables utilized by the second application; and
   communicating, by the first debugger to a second debugger, information associated with the error condition in the first application.

2. The method of claim 1 wherein initiating the first debug session of the first application further comprises registering the first debug session of the first application in an active debug session registry.

3. The method of claim 1 further comprising initiating, by the second debugger, the second debug session of the second application, including registering the second debug session of the second application in an active debug session registry.

4. The method of claim 1 wherein the information associated with the error condition in the first application includes a line number in the first application at which the error condition occurred.

5. The method of claim 1 wherein the information associated with the error condition in the first application includes names and values of variables in the second application that are related to variables in the first application.

* * * * *